INVENTORS
EDMOND M. DELORAINE
STANISLAS VAN MIERLO
BORIS DERJAVITCH

BY

R P Morris
ATTORNEY

INVENTORS
EDMOND M. DELORAINE
STANISLAS VAN MIERLO
BORIS DERJAVITCH
BY
R. P. Morris
ATTORNEY Patented Feb. 24, 1953 2,629,857

UNITED STATES PATENT OFFICE 2,629,857

COMMUNICATION SYSTEM UTILIZING CONSTANT AMPLITUDE PULSES OF OPPOSITE POLARITIES

Edmond Maurice Deloraine, New York, N. Y., Stanislas Van Mierlo, Antwerp, Belgium, and Boris Derjavitch, Paris, France, assignors to International Standard Electric Corporation, New York, N. Y., a corporation of Delaware Application October 8, 1947, Serial No. 778,662
In France August 10, 1946

Section 1, Public Law 690, August 8, 1946
Patent expires August 10, 1966

3 Claims. (Cl. 332—11)

The present invention relates to a method and system of electric transmission by differentiated impulses.

Various transmission methods employing impulses are of prior knowledge. In particular, the information is transmitted in certain cases by displacing the impulses in time. These systems present the advantage that the message to be transmitted is affected by interferences to a relatively small extent because they only slightly modify the position of the impulses in time. Besides, it is possible to block the receiving circuit for the entire time during which no impulse is to be received, so as to completely eliminate any interference effect during that time. It is to be noted that the minimum time during which the circuit is in receiving condition is determined by the shape of the impulse and by its displacement in time. This leads to the following dilemma: either use is made of a fairly considerable displacement, thus increasing the length of the period during which the interferences act on the circuit, or use is made of a fairly small displacement, thus increasing the effect of the interferences.

The main object of the present invention is to provide a transmission system, by impulses not displaced in time, that is only slightly affected by interferences.

This object is attained on the one hand by reducing as much as possible the length of the period during which the receiving circuit is in a receiving condition, thus considerably lessening the time during which the interferences can act; and, on the other hand, by employing the portion of the impulse that has the maximum amplitude, so as only to make it possible for the interferences to modify the received message if they have such an amplitude that the impulse is transformed into an impulse of another kind. The two kinds of impulses to be employed can, for example, be furnished by positive or negative impulses, or by impulses transmitted at different carrier frequencies.

Features of the present invention will be seen in the following description of two examples of embodiment, which also show methods of translating any variable current by a sequence of impulses consisting of two types of impulses of different kinds, e. g. positive and negative. The description is given with reference to the appended drawings, in which.

Figure 1:
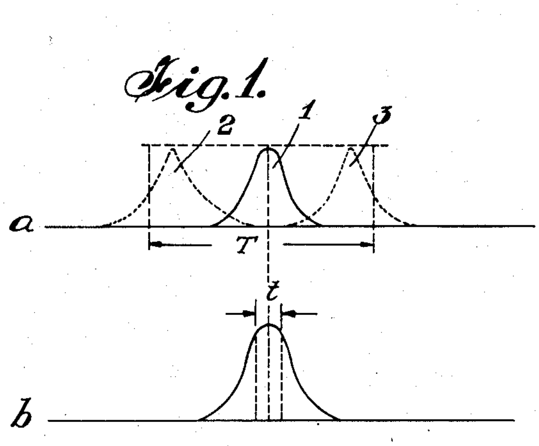
Fig. 1 is a diagram which compares a displaced impulse system and the differentiated impulse system that forms the object of the invention.

Referring to Fig. 1, the *a* portion of this figure shows at 1 the mean position of a displaced impulse, and at 2 and 3 its respective end positions, the spacing of which corresponds to a duration T. The receiving circuit has accordingly to be influenced by the signals received during the time T. The *b* portion shows the case of an impulse stationary in time; in this case it is sufficient to make the receiving circuit active during the time *t*, the duration of which is much less than that of T.

It is to be noted however that, in the case of a differentiated impulse system, it is probably necessary to make use of a greater number of impulses per second; it will accordingly really be necessary to multiply the time *t* by a certain factor in order to be able to make an effective comparison between the two methods.

Then too, a fairly intense interference may appreciably modify the shape of the impulse shown in Fig. 1*a* and accordingly modify the signal to be transmitted, while it will remain without effect in the case of Fig. 1*b* as long as its insity is not sufficient to change the impulses from one type into impulses of another type so as to reverse their direction.

Figure 2:
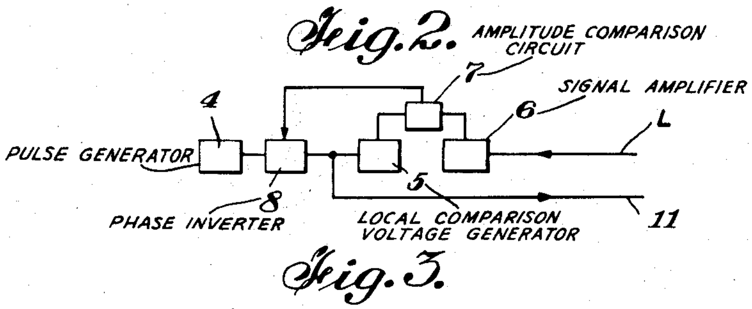
Fig. 2 is a schematic showing the principle of a circuit employing features of the invention.

Fig. 2 shows the operating principle of an arrangement employing features of the invention. The impulses produced by a generator 4 establish at 5 a potential that is continuously compared to the potential obtained at 6 from the effect of the signals to be transmitted that arrive over line L.

As soon as the potential at 5 exceeds the one at 6, a circuit 7 acts on a reverser 8 which changes the direction of the impulses produced at 4. As soon as the potential at 5 is less than the potential at 6, the direction of the impulse is restored.

Figure 3:
Fig. 3 is a diagram showing how a variable current can be replaced by a series of positive and negative pulses.

Fig. 3 shows how a variable current is translated by positive and negative impulses. In this Fig. 3, curve 9 represents the potential at 6, and curve 10 the potential at 5. Impulses are sent at the moments $t_n$, $t_{n+1}$, etc., and they produce an increase of the potential at 5 when they have a direction that will be called "positive" and a reduction of this potential when they have a "negative" direction. In the illustrated example, the impulse sent at the time $t_{n+2}$ produces at 5 a potential greater than the one at 6, so that circuit 7 acts on 8 and reverses the direction of the next impuse; the potential at 5 again becomes lower than the one at 6, and circuit 7 restores the positive direction for the impulses sent at the times $t_{n+4}$ and $t_{n+5}$.

It is accordingly possible to reproduce any variable current with a fair amount of fidelity by means of these impulses which all have the same amplitude and which are regularly disposed in time. The impulses can then be sent to a distance over line 11 and at the receiving station can reproduce the incoming signal at L. The receiver can comprise a circuit that releases it at the exact moments when the impulses have their maximum intensity.

It is evident that for rendering the original signal with a certain fidelity, it is necessary to have a number of impulses per second equal to the maximum frequency to be transmitted multiplied by a suitable factor.

Since the signal that is reproduced at the receiving end may contain a fairly high percentage of frequencies higher than the maximum frequency to be transmitted, these frequencies are to be eliminated by a filtering that will make it possible to reproduce the original curve with greater fidelity; in particular, the low frequencies of the signal, down to zero, are rendered with great fidelity.

Figure 4:
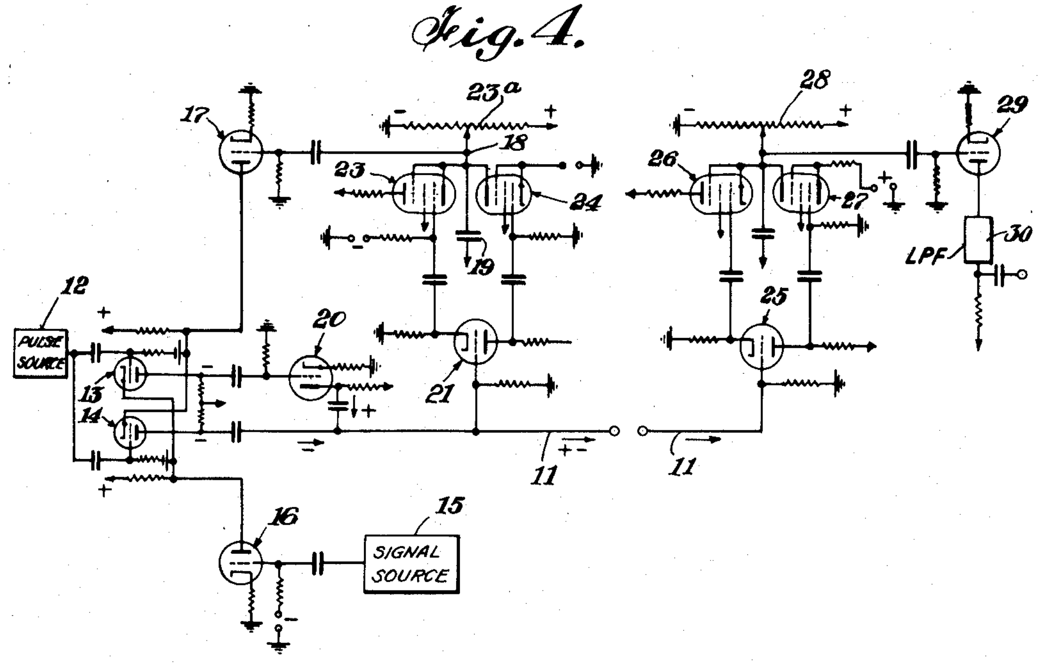
Fig. 4 is an example of embodiment of the schematic arrangement shown in Fig. 2.

Fig. 4 illustrates an example of embodiment of the system shown schematically in Fig. 2. It shows the transmitter at the left-hand side and the receiver at the right-hand side. The positive impulses I+ are received continuously from source 12 by tubes 13 and 14, which are normally blocked. The "low frequency" signals to be transmitted are sent from signal source 15 to the grid of a tube 16, while the grid of a tube 17 is controlled by the potential $U_1$ at a point 18 that is produced locally by the charge of a condenser 19 and that has to keep close to the voltage of the signals to be transmitted.

When the voltage of the signals and the voltage at point 18 are almost equal, the two tubes 13 and 14 remain blocked and no impulse passes over line 11. If, however, the grid voltage of 16 exceeds that of 17, the plate current of 16 increases; tube 14 remains blocked, but 13 releases and allows a negative impulse to pass to a tube 20 which transforms it into a positive impulse that is sent over line 11 and to the condenser charging device, of which there is one at the receiving end. This positive impulse produces positive and negative impulses on the cathode and plate respectively of a tube 21.

In order to produce the local comparison voltage, there are provided tubes 23 and 24, which are normally blocked, and a condenser 19, which is normally charged at half the anode voltage by means of a high impedance potentiometer 23. As a result of the impulses that 23a and 24 receive from 21, the impedance of 23a diminishes, but 24 remains blocked. The voltage at point 18 accordingly tends to increase and condenser 19 is charged during the time the impulse lasts. Owing to the high impedance of 23a, this charge only diminishes very slightly in the interval between two impulses.

If the potential at 18 still remains less than that of the signals to be transmitted, the above cycle is repeated under the effect of the next impulse.

In case the potential at 18 exceeds that of the signals, it is tube 13 that is blocked and tube 14 that is released. Negative impulses are then sent over the line and to the charging devices of 19. These impulses cause a lessening of the impedance of tube 24 and a dicharge of the condenser during the time they last; the potential at point 19 consequently decreases.

At the receiving end, the incoming impulses pass over similar circuits that comprise tubes 25, 26, 27 with impedance 28, and tube 29, reproducing the same variations and consequently reproducing the transmitted signal; they then pass through a low pass filter 30 which stops the frequency of the impulses and reproduces the transmitted "low frequency" signals.

The grid bias voltages and those of the impulses can be adjusted so that 13 or 14 are more or less rapidly released. It is thus possible, either to send no impulse over the line when the difference between the voltages is slight, although outside interferences may then more easily produce wrong signals, or preferably to always have positive or negative signals on the line.

Besides, as mentioned above, the system may comprise an arrangement (not shown) which only releases the receiver during the very short time during which the incoming impulses have their maximum intensity.

In the described system, each impulse sent from the transmitter to the receiver only gives a rather summary indication, and only informs the receiver that the voltage has to increase or diminish. It may be advisable to transmit a more precise indication, e. g. slow increase, rapid increase, slow reduction, rapid reduction.

According to a variant of the invention, use may be made for this purpose of groups of two or more impulses. Thus, with two impulses, there are obtained four combinations: + +, + −, − + − −, each corresponding to one of the four above mentioned cases. Reference is made to U. S. Patent No. 2,272,070 of A. H. Reeves for more detailed description of such a system.

Although the invention has been described for one single example of embodiment, it is evident that it is not limited to the same and that it is possible to make modifications or improvements without departing from its scope.

For example, it is possible to adapt the system for transmitting different messages simultaneously. To do this, series of impulses that serve for transmitting other messages can be transmitted over line 11 in the interval between times $t_n$ and $t_{n+1}$ by employing synchronous distributors, preferably electronic ones, that successively connect line L' to the respective desired transmitting and receiving circuits.

In particular, it may be advantageous to first split up the signal to be transmitted into several partial signals and to transmit these over different channels by means of a system of distributors. The maximum frequency to be transmitted by each channel may thus be less. An example of a case of this kind is that in which a telephone message is transmitted by means of a group of signals of relatively low frequency which respectively control at the destination office the intensity of a current having a frequency that corresponds to the average of one of the elementary frequency bands into which the complete spectrum of the telephone message has been divided, these signals being transmitted simultaneously over a number of channels equal to the number of created elementary bands, e. g. dozen.

Figure 5:
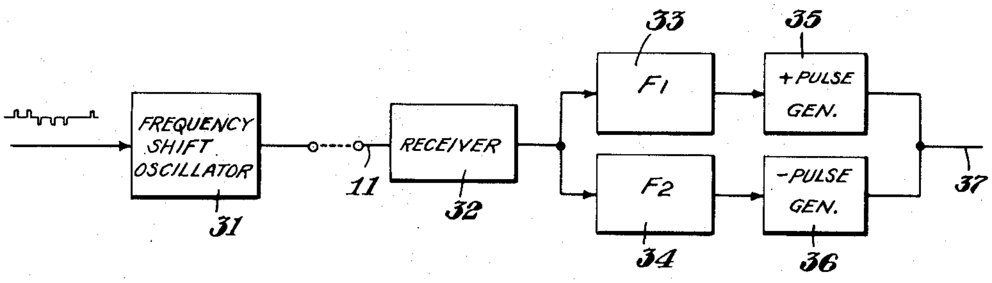
Fig. 5 is a block diagram of a modification of Fig. 4.

Also for example, in case the impulses are transmitted from the transmitter to the receiver by means of a carrier current or of a wave, it is no longer possible to transmit positive or negative impulses without having continuous emission of the carrier current, which is not desirable, but use may then be made of two carrier frequencies, one for transmitting the signals that correspond to the positive impulses, and the other for transmitting the signals that correspond to the negative impulses. Such a system is illustrated in Fig. 5 wherein the additional elements may be inserted as shown. The output pulses may be applied to frequency shift oscillator 31 or similar source of two frequencies F1 and F2 so that upon line 11 or from a radiating source, pulses representative of the discrete signals may be transmitted. These signals may be received on a receiver 32, separated by filters 33 and 34 and regenerated into positive and negative pulses at generators 35 and 36. These pulses may then be applied over line 37 to the receiver equipment shown in Fig. 4. Since it is possible at the receiving end to filter the central portion of the spectrum and also to space the two frequencies by an amount that only slightly exceeds the pass band width of the filters, this variant of the invention does not lead to doubling the band width. The elimination of a portion of the band results in a deformation of the received impulses, but this is only of slight importance in most cases.

With this method of transmission it may also be advisable to transmit more precise indications to the receiver, e. g. slow increase, rapid increase, slow reduction, rapid reduction. Use will then be made of more than two carrier frequencies or their combinations will give the receiver the desired precise indications.

We claim:

1. A system for transmitting signals substantially representative of a given wave having a given function comprising means for generating locally a wave similar to said given wave, means for comparing a characteristic of said given wave and said locally generated wave, means for generating signals responsive to said comparison of said waves and characteristic of the comparison value, said signals having a wave form substantially different from the waveforms of either of said waves, said means for locally generating a wave comprising means for effectively reconstructing said given wave in response to said signals, and means for transmitting said signals.

2. A signalling system comprising a source of control pulses, a normally inoperative comparison circuit for producing a pulse of either one of two characteristics depending upon which of two voltages applied thereto is greater than the other, connections for applying said control pulses to said comparison circuit to periodically render it operative, a signal wave source, means for applying the signal wave from said source to said comparison circuit, an integrating storage circuit coupled to the output of said comparison circuit, and means for coupling said integrating circuit to the comparison circuit, the signal wave and the integrated wave being compared in said comparison circuit, whereby the output energy of said comparison circuit is a pulse timed with said control pulses and of a characteristic dependent upon the amplitude difference of said signal wave and said integrated wave.

3. A system according to claim 2 wherein said storage integrating circuit comprises a storage device, a pair of pulse responsive circuits coupled to said storage device, one arranged to charge said device a given amount upon each conduction thereof and the other arranged to discharge said storage device a given amount upon each conduction thereof, and connections from the output of said comparison circuit for causing conduction in one of said pulse responsive circuits when the output of said comparison circuit has one characteristic and for causing conduction in the other of said pulse responsive circuits when said output has the other characteristic.

EDMOND MAURICE DELORAINE.
STANISLAS VAN MIERLO.
BORIS DERJAVITCH.

REFERENCES CITED

The following references are of record in the file of this patent:

UNITED STATES PATENTS

| Number | Name | Date |
|---|---|---|
| 1,796,430 | Kell | Mar. 10, 1931 |
| 2,202,605 | Schroter | May 28, 1940 |
| 2,272,070 | Reeves | Feb. 3, 1942 |
| 2,321,611 | Moynihan | June 15, 1943 |
| 2,426,204 | Grieg | Aug. 26, 1947 |
| 2,426,225 | Kraus | Aug. 26, 1947 |
| 2,433,407 | Tahon | Dec. 30, 1947 |
| 2,438,908 | Goodall | Apr. 6, 1948 |
| 2,464,607 | Pierce | Mar. 15, 1949 |